3,239,006
MIXED PROPS FOR HIGH FLOW CAPACITY FRACTURES
Clarence R. Fast, Tulsa, Okla., assignor to Pan American Petroleum Corporation, Tulsa, Okla., a corporation of Delaware
No Drawing. Filed Dec. 19, 1962, Ser. No. 245,661
2 Claims. (Cl. 166—42)

This invention relates to hydraulic fracturing of earth formations such as oil-producing formations penetrated by wells. More particularly it relates to an improved method using mixed props for forming fractures having high flow capacities.

It is customary in fracturing operations to deposit sand in the fracture to prop the fracture open and increase its flow capacity. The use of many other materials such as aluminum, steel balls, glass beads, and the like, has also been proposed. Sand and glass beads are examples of props which are brittle and tend to shatter under high overburden load. The result is that the fracture tends to close and the wide particle size distribution of the shattered props tends to form a bridge and seal in the fracture to decrease flow rates. Malleable props, such as aluminum, deform under high loads and tend to flow and fill the spaces between particles to decrease flow rates. In addition, most malleable propping materials such as aluminum or its alloys are very expensive compared to sand.

An object of my invention is to provide a propping agent for fractures which overcomes at least some of the difficulties with propping materials used in the past. Still other objects will be apparent from the following description and claims.

In general, I accomplish the objects of my invention by use of a mixture of malleable and brittle props of about the same size. Preferably, the props should also have approximately the same specific gravity and shape.

I have found that a mixture containing from about 1 to about 10 times as many brittle props as malleable props is desirable. This mix provides a fracture having a higher flow capacity and apparently a longer life than either the unmixed brittle or malleable props alone. Two distinct types of action may take place when the mixed props are used, depending on the conditions.

In a fairly shallow well where the formation is rather soft, a high ratio of malleable to brittle props is used and the brittle props are slightly smaller than the malleable props, the brittle props will not shatter. This is because the overburden load is low, the brittle props can become imbedded in the formation to a considerable distance before the load becomes sufficient to cause them to fracture, and the high concentration and large size of the malleable props cause these props to carry a large part of the load.

At the other extreme is a deep well where the formation is very hard, a low ratio of malleable to brittle props is used, and the malleable props are slightly smaller than the brittle ones. In this case the brittle props will almost all be shattered or crushed.

In the first case the malleable props help prevent crushing of the brittle props. The uncrushed brittle props in return help prevent excessive flattening and deformation of the malleable props. The result is a layer of undeformed and uncrushed props having a high flow capacity.

In the second case the fragments of crushed brittle props are washed out of the fracture by flow of formation fluids, leaving widely spaced malleable props with large free areas between them for flow of fluid.

Between the two extremes is a range of conditions in which partial crushing or shattering of the brittle props may occur. It is preferable to plan a fracturing job to provide either substantially complete crushing or substantially no crushing of the brittle props. This is usually possible since both the amounts and sizes of both brittle and malleable props can be varied. It should be noted, however, that even when partial crushing of the brittle props occurs, the results are better than with either brittle or malleable props alone. The presence of the malleable props decreases the degree of crushing of brittle props. The malleable props also place a limit on the degree to which the fracture can close. The brittle props, in return, support at least a part of the load and decrease the degree to which the malleable props are deformed, thus again decreasing the amount to which the fracture can close.

For economic reasons the brittle props are generally sand or glass beads. Tests in the laboratory have shown that when these materials shatter, they do not ordinarily break up into sufficiently small particles to be removed from the fracture by flow of liquids. Props of a material with a much greater tendency to shatter into small particles are necessary if the resulting small particles are to be washed out of the fracture. Tempered glass beads, very brittle resins, and the like, are necessary for this purpose. From a practical standpoint, it is usually advisable to employ sand or ordinary glass beads as the brittle prop and adjust the props and sizes of malleable and brittle props to avoid shattering of the brittle props. In general, this means that the brittle props should be no larger than the malleable props and should preferably be slightly smaller. It also means that the malleable props should make up at least 10 percent and preferably about 20 or 30 percent by volume of the props. In deep, hard formations the volume of malleable props may sometimes be as great as the volume of brittle props.

The malleable props are preferably manufactured from a strong metal or alloy such as aluminum or an aluminum alloy. Other malleable materials such as nutshells or plastics such as nylon may also be used.

The results of some laboratory tests will illustrate the basis for the above comments. In the tests a 20-ton capacity hydraulic ram was assembled so that loads could be applied to short cylindrical core sections. The cores were from either the Grayburg lime or from the Mesa Verde sand. The Grayburg cores were obtained from wells in New Mexico. The Mesa Verde cores were obtained from wells in Wyoming. These two particular cores were selected since they have substantially the same resistance to embedment by a propping bead.

The cores were sawed to expose smooth circular surfaces 3½ inches in diameter. The mixed propping material under test was uniformly distributed over the surface between two of these core sections. The assembly was mounted in the hydraulic ram and the desired load was applied. A hydraulic pump connected to the 20-ton ram automatically maintained pressure on the system. In all the tests the ram pressure was sufficient to apply a load of 10,000 pounds per square inch to the props. From previous field experience this is known to be equivalent to an overburden depth of about 11,000 feet.

The fracture capacity was calculated from data obtained by flowing nitrogen under a measured differential pressure through the fracture from a central hole drilled in the upper half of each core assembly. This provided a flow capacity for the fracture as originally formed. To obtain a value for the flow capacity after flow of a liquid, water was introduced through the central hole and was forced to flow through the mixed props. After this washing operation, the props were thoroughly dried by blowing air through them, after which a second reading was taken on the flow capacity in the same way as before. The results of the tests are presented in Table I.

TABLE I

| Test | Malleable props | | | Brittle props | | | Flow capacity, md. ft. | |
|---|---|---|---|---|---|---|---|---|
| | Type | Size | Amount | Type | Size | Amount | Before wash | After wash |
| 1 | Aluminum | −12+16 | 0.1 | Glass beads | −12+16 | 0.9 | 1,296 | 78 |
| 2 | do | −12+16 | 0.25 | do | −12+16 | 0.75 | 6,870 | 1,236 |
| 3 | do | −12+16 | 0.1 | Rounded sand | −12+16 | 0.9 | 587 | 206 |
| 4 | do | −12+16 | 0.25 | do | −12+16 | 0.75 | 1,444 | 847 |
| 5 | do | −12+16 | 0.25 | River sand | −12+16 | 0.75 | 587 | 56 |
| 6 | do | −14+16 | 0.25 | Glass beads | −12+14 | 0.75 | 72 | 14 |
| 7 | do | −14+16 | 0.25 | do | −12+14 | 0.55 | 261 | 43 |
| 8 | None | | | Rounded sand | −12+16 | 1.00 | 115 | 14 |
| 9 | Aluminum | −12+16 | 1.00 | None | | | ,394 | 3,951 |
| 10 | do | −12+14 | 0.25 | Glass beads | −14+16 | 0.75 | 3,089 | 1,275 |
| 11 | do | −12+14 | 0.25 | do | −16+18 | 0.75 | 3,461 | 1,275 |
| 12 | do | −12+14 | 0.25 | do | −18+20 | 0.75 | 3,071 | 1,850 |
| 13 | do | −12+14 | 0.25 | do | −20+25 | 0.75 | 3,264 | 1,438 |
| 14 | do | −12+14 | 0.25 | Rounded sand | −14+16 | 0.75 | 1,362 | 236 |
| 15 | do | −12+14 | 0.25 | do | −16+18 | 0.75 | 3,737 | 1,884 |
| 16 | do | −12+14 | 0.25 | do | −20+25 | 0.75 | 3,531 | 2,321 |
| 17 | Acetal resin | −10+12 | 0.25 | do | −16+18 | 0.75 | 596 | 66 |

In the table the sizes of props are given in U.S. Standard sieve series sizes. Thus, −12+16 means the props would pass a No. 12 sieve and be retained on a No. 16 sieve. The amounts of props are given in terms of the fraction of the props which would be required to form a complete monolayer. The flow capacity values are in millidarcy feet. The rounded sand was a special pure quartz sand with well-rounded grains frequently used in fracturing because of its roundness and purity and, hence, its superior strength. The aluminum in every case was actually an aluminum alloy with somewhat higher compressive strength than pure aluminum.

Tests 3 through 5 when compared to Test 8 show the effects of substituting a little aluminum for some of the sand. Both the aluminum and sand particles were of about the same size in these tests. The reason for the difference of results with glass beads in Tests 1 and 2 compared to sand in Tests 3 through 5 probably lies in the differences in the strength of the props. The glass beads were stronger than the rounded sand grains and the rounded sand was stronger than the river sand. Even the river sand particles were not all crushed, however, in spite of the heavy load placed in the props. The less desirable results when using only 1/10 monolayer of aluminum rather than 1/4 monolayer shows the improved results to be obtained by use of more than 1/10 monolayer of the malleable props. In general, the amount of brittle props should be between about 1 and about 10 times the volume of the malleable props.

Tests 6 and 7 show the need for using something such as tempered glass beads which will shatter into very small particles if the brittle props are to be larger than the malleable props. It is apparent from the results of these tests that ordinary glass beads do not shatter into small enough particles to be washed out of the fracture.

Tests 8 and 9 employed full monolayers of said and aluminum. The results of these tests are included for comparison to the results obtained with mixtures of these props. Test 9 is particularly interesting because it shows that the malleable aluminum alloy particles, which merely deform rather than being crushed, did not provide small particles which could seal the openings between the larger particles. As a result, the flow capacity of the fracture did not decrease greatly when a liquid was forced to flow through the fracture. The small decrease which occurred was probably due to a slight crushing of the formation faces to provide a limited amount of small particles.

Tests 10 to 13 with glass beads smaller than aluminum props and Tests 14 to 16 with sand grains smaller than the aluminum props show the good results which can be obtained by this technique. It will be apparent that the beads are strong enough to stand up rather well even if they are almost as large as the aluminum props and, thus, must carry a large part of the load. The sand grains, however, should be considerably smaller than the aluminum props if crushing of the sand grains is to be avoided. The brittle props should not be smaller than about ½ the diameter of the malleable props, however, if the brittle props are to carry any of the load. In addition, there is some danger with the smaller props that they may tend to form double layers which may carry a large amount of the load and thus crush badly. Preferably, the brittle and malleable props should be of substantially the same size. That is, the average diameter of one should be no more than about twice the diameter of the other.

A comparison of Test 8 to Test 17 shows that improved results can be obtained by substituting acetal resins for a part of the sand props. This is particularly significant since the resin was considerably weaker than the aluminum alloy used as the malleable propping material in the other tests. This indicates that other weaker malleable materials, such as ground walnut shells, can also be used.

Field tests of mixed aluminum and sand props were made in 17 wells in a single field. In 16 of these, about 32,500 pounds of −20+40 mesh sand in 16,300 gallons of oil containing a fluid loss reducing agent were first injected. Then 400 pounds of −12+14 mesh aluminum pellets and 2,500 pounds of −20+40 mesh sand in 1,200 gallons of oil were introduced into the fracture to give the fracture a high flow capacity near the well. In the other well about 27,500 pounds of −10+20 mesh sand in 27,000 gallons of the treated oil were first injected and followed by 400 pounds of −12+16 mesh aluminum pellets and 2,500 pounds of −10+20 mesh sand in 3,000 gallons of treated oil.

Results obtained in these 17 tests were compared to results in 31 off-set wells using approximately the same treatment except omitting the aluminum. At the time a comparison was made, different numbers of wells had been produced for various lengths of time. The results of the comparison are presented in Table II.

TABLE II

| Months following fracture | Conventional jobs | | Aluminum jobs | |
|---|---|---|---|---|
| | No. of wells | Increased prod. barrels/day | No. of wells | Increased prod. barrels/day |
| 0 | 31 | 59 | 17 | 59 |
| 1 | 31 | 29 | 17 | 48.5 |
| 2 | 25 | 28.5 | 15 | 37.5 |
| 3 | 19 | 22 | 11 | 29.5 |
| 4 | 16 | 5 | 9 | 34.5 |
| 5 | 11 | 5.5 | 5 | 34.5 |

It will be apparent that the small amount of aluminum near the well was insufficient to provide an initial producing rate increase greater than that provided by an ordinary fracture job using only sand as a propping agent. As flow of liquids through the formation continued, a reduction in flow rate occurred both with and without aluminum just as it did in the laboratory tests. The results in Table II show clearly, however, the the presence of the aluminum greatly reduced the rate of decline in the flow capacity.

From the above laboratory and field data, two conclusions can be drawn. First, if a mixture of aluminum and sand is used in enough of the fracture, higher initial fracture flow capacities can be achieved. Second, the presence of aluminum with the sand greatly reduces the rate of decline in the flow rate when a well is produced over a long period of time. It will be apparent that I have fulfilled the objects of my invention. The aluminum prevents excessive shattering of the sand, thus overcoming one of the principal objections to use of brittle props. The sand helps support the overburden load to prevent excessive deformation of the aluminum, thus overcoming one of the principal difficulties with malleable props. In addition, the substitution of sand for part of the aluminum greatly decreases the cost of propping material.

I claim:

1. In a method of fracturing an oil-bearing formation penetrated by a well in which method a fracturing liquid is introduced down said well and is forced into said formation under a pressure sufficient to fracture said formation, in which method props are introduced into the fracture to hold it open for flow of fluids from said formation to said well, and in which the overburden load is sufficient to crush brittle props such as sand if used alone, the improvement comprising using as props a mixture of malleable and brittle particles, the ratio of said brittle particles to said malleable particles being from about 1 to 1 to about 10 to 1 and the average diameter of said malleable particles being from about 1.4 to about 2.0 times as large as the average diameter of said brittle particles.

2. The method of claim 1 in which said malleable particles are selected from the group consisting of aluminum and aluminum alloys and said brittle particles are sand grains of the type ordinarily used as fracture props.

References Cited by the Examiner

UNITED STATES PATENTS 2,950,247 8/1960 McGuire et al. ____ 166—42.1 X
3,173,484 3/1965 Huitt et al. _____ 166—42.1 X CHARLES E. O'CONNELL, *Primary Examiner.*